Figure 1:
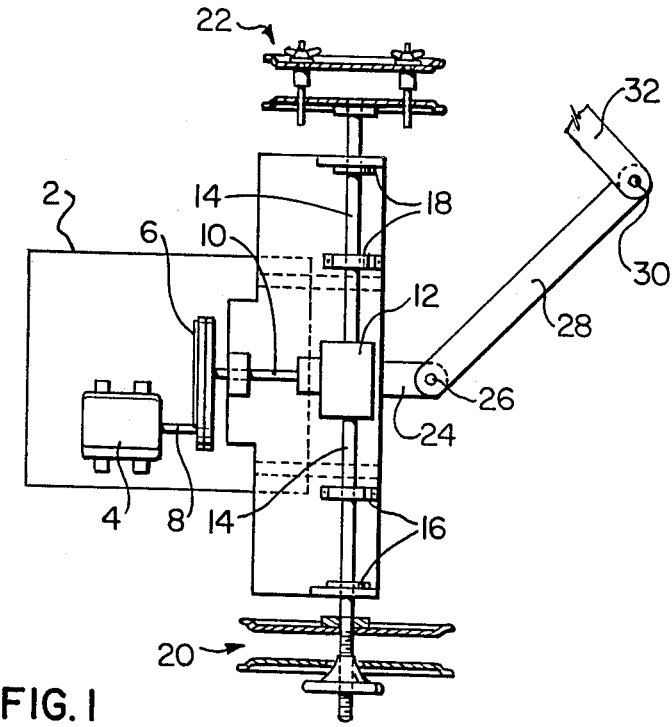

United States Patent [19]

Penner

[11] Patent Number: 4,852,812

[45] Date of Patent: Aug. 1, 1989

[54] APPARATUS AND METHOD FOR PREPARING FRAGMENTS FROM TIRE CASINGS

[76] Inventor: Reuben Penner, Box 975, Cranbook, British Columbia, Canada, V1C 4J6

[21] Appl. No.: 148,908

[22] Filed: Jan. 27, 1988

[30] Foreign Application Priority Data

May 8, 1987 [CA] Canada .................................. 536693

[51] Int. Cl.[4] ............................................. B02C 19/12
[52] U.S. Cl. ........................................ 241/24; 241/81; 241/279; 241/DIG. 31
[58] Field of Search ................... 241/DIG. 31, 24, 81, 241/101.4, 279

[56] References Cited

U.S. PATENT DOCUMENTS 1,746,998  2/1930  Gamel .................... 241/DIG. 31 X

FOREIGN PATENT DOCUMENTS 1070099  1/1980  Canada .
54778    5/1977  Japan .......................... 241/DIG. 31
11184    1/1979  Japan .......................... 241/DIG. 31

Primary Examiner—Mark Rosenbaum
Attorney, Agent, or Firm—R. William Wray & Associates

[57] ABSTRACT

Apparatus and method for preparing fragments from tire casings in which an umbrella type tire casing support is provided and an electric motor is utilized to rotate the tire casings so that a cutter can be utilized to convert the tire casing into fragment portions, the cutter being mounted for slidable movement towards and away from the tire casing.

10 Claims, 5 Drawing Sheets

APPARATUS AND METHOD FOR PREPARING FRAGMENTS FROM TIRE CASINGS

This invention relates generally to an apparatus and method for reducing tire casings and the like to small fragments.

A tire casing is a relatively bulky item, sometimes 11 feet in diameter, and storing used tire casings in dumps takes up a large amount of space on the North American continent and represents an environmental problem.

Tires have previously been burned but a more practical method of tire disposal has been sought for some time and there have been previous methods and apparatus proposed for producing fragments from tire casings. However, the fragments are not usually fine enough to permit re-use in another product.

From one aspect it is an object of the present invention to provide an improved apparatus for reducing tire casings to fine fragment form.

According to this aspect there is provided apparatus for preparing fragments from tire casings comprising, means for supporting a tire casing, means for rotating the tire casing, cutter means for converting said tire casing into fragment portions, said cutter means being mounted for slidable movement on a first arm member, said first arm member being pivotally mounted on a second elongate arm member, said second arm member being itself pivotally mounted on a stationary supporting member, whereby said cutter means is capable of movement towards and away from said tire casing.

From another aspect it is an object of the present invention to provide an improved method for reducing tire casings to fine fragment form.

According to this aspect there is provided a method of disposing of used or unwanted tire casings comprising the steps of collecting the tire casings, separating metal portions from said tire casings, shredding the tire casings by use of apparatus according to the immediately preceding penultimate paragraph, screening the shredded tire casings into appropriate portions according to size, processing said portions for marketing, the processing being dependent on the eventual market of the respective portions.

Figure 2:
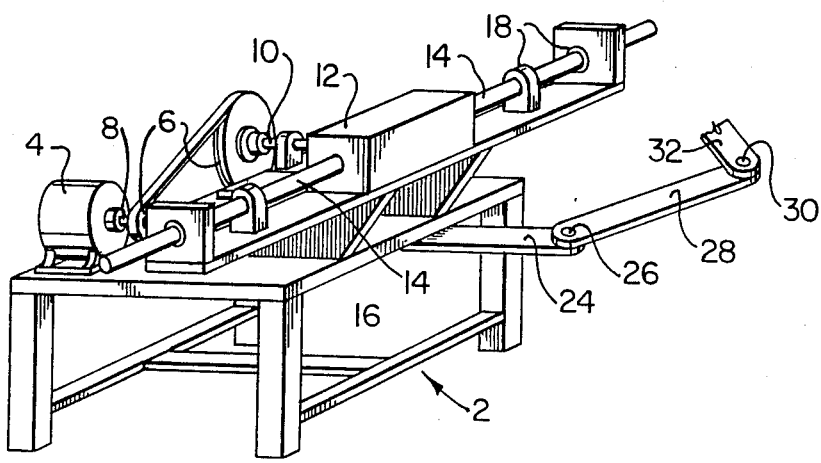
Figure 3:
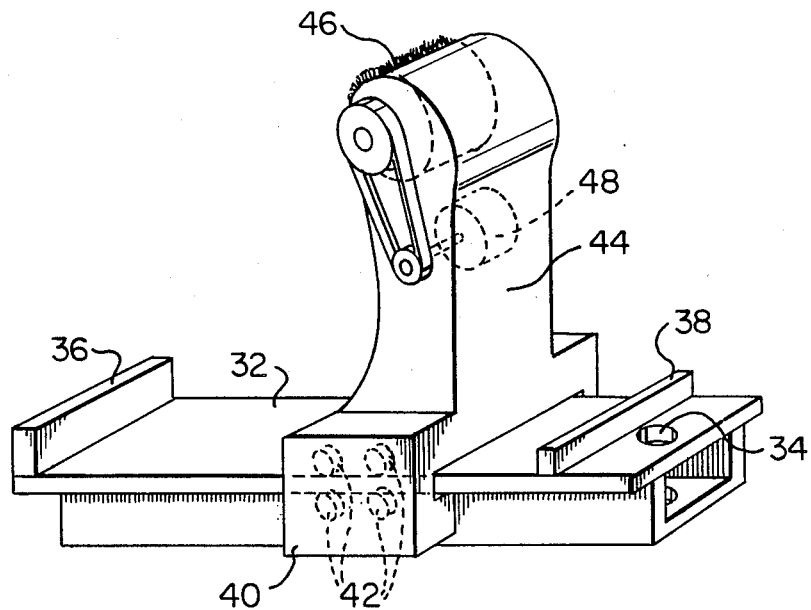
Figure 4:
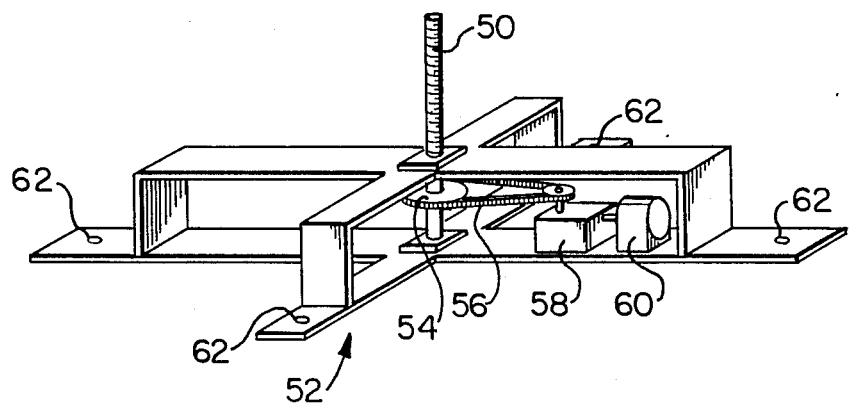
Figure 5:
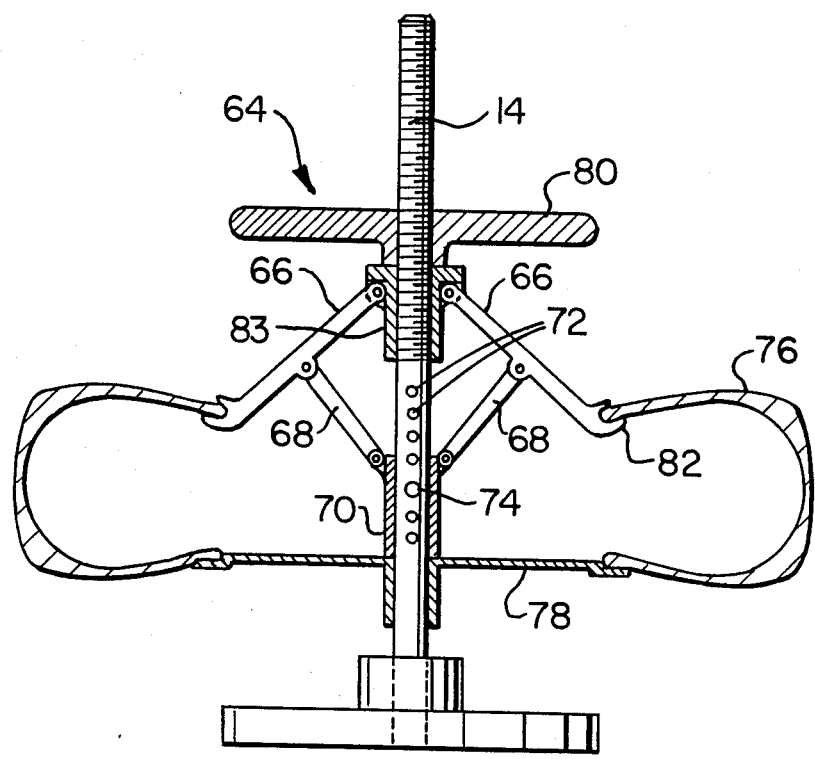
Figure 6:
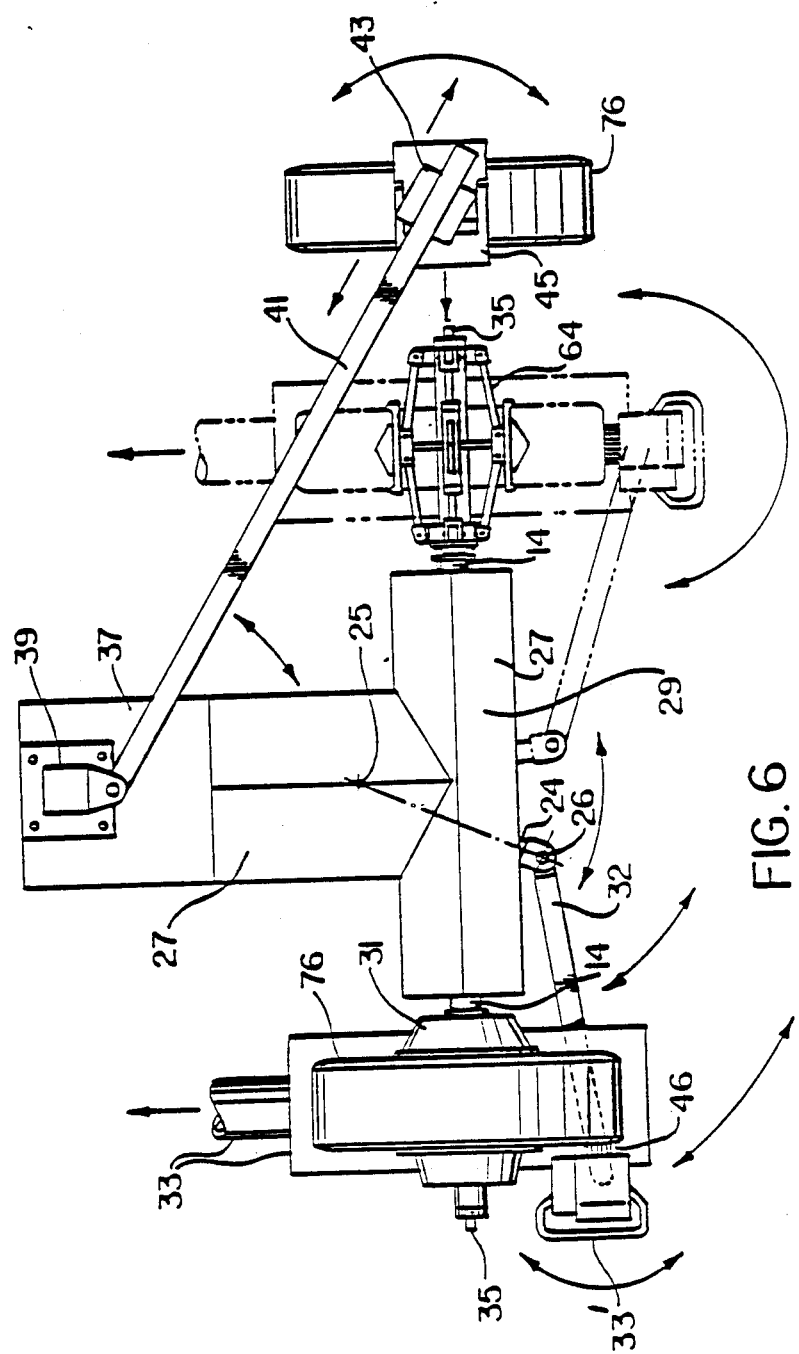
Figure 7:
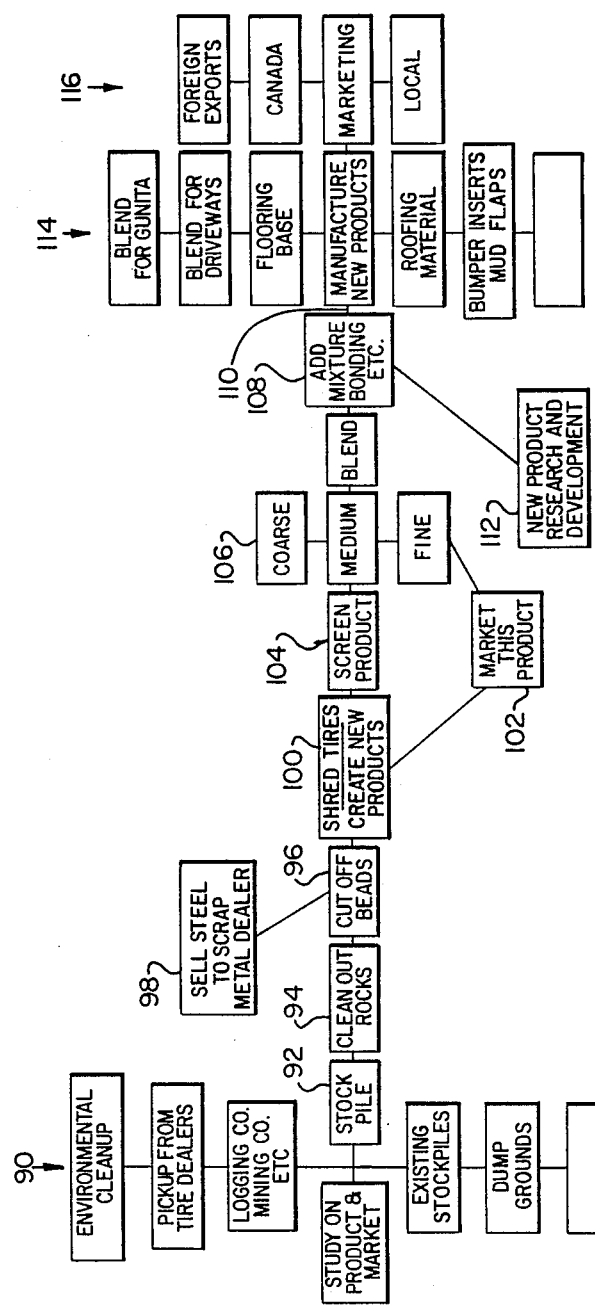

Embodiments of the invention will now be described, by way of example, with reference to the accompanying drawings in which:

FIG. 1 is a plan view of part of the apparatus for preparing fragments from tire casings according to one embodiment of the invention, FIG. 2 is a perspective view of part of the apparatus of FIG. 1, FIG. 3 is a perspective view showing the mounting of a tire cutter or tire rasp blade for use in the apparatus of FIG. 1, FIG. 4 is a perspective view showing part of a second embodiment of the invention in detail, FIG. 5 is a partly sectional view of a tire supporting mechanism, FIG. 6 is a diagrammatic representation of a further embodiment of the invention, and FIG. 7 is a block diagrammatic representation of one method for preparing fragments from tire casings and the subsequent distribution thereof.

Referring to FIG. 1 part of the apparatus for preparing fragments from tire casings is shown in plan view. A supporting table 2 is provided having thereon an electric motor 4 driving a double pulley arrangement 6 by way of shaft 8. The upper pulley is provided with a drive shaft 10 for rotation of the mechanism within a gear box 12. By way of that gear box a main drive shaft 14 is driven and is provided with supporting bearing members 16 and 18 as shown in FIGS. 1 and 2. The main shaft 14 extends beyond the edges of the table and beyond the bearing members 16 and 18.

At each end of the shaft 14 there is provided a tire clamping and supporting mechanism 20 and 22. An elongate supporting member 24 extends below and beyond the edge of the table member 2 as clearly shown in FIGS. 1 and 2. A pivot member 26 is provided at the end of the elongate member 24. A moveable arm member 28 is pivotable at one end on the pivot 26 whilst it is itself provided with a pivot member 30 at its other end. On that pivot 30 there is supported slider member 32 capable of movement on the pivot member 30 (see FIG. 1).

The slider member 32 is shown in greater detail in FIG. 3 and the aperture 34 for receiving the pivot 30 can be clearly seen. The shape of the slider member 32 is as illustrated and it is provided substantially at each end with stop members 36 and 38. A moveable carriage 40 is capable of slideable movement between the stop members by way of wheels 42 provided on either side of the carriage above and below extended portions of the slider member 32. A cutter arm 44 having a cutter or tire rasp blade 46 extends from the carriage 40 (as shown in FIG. 3). The cutter 46 is driven by a motor 48 and may be of any suitable type. However, one type which has been found to be appropriate is that disclosed in Canadian Pat. No. 1,070,099, issued Jan. 22, 1980 (Wayne E. Jensen).

In FIG. 1, the tires are mounted in a vertical direction. Referring to FIG. 4 there is diagrammatically illustrated a second embodiment of the present invention whereby a tire can be supported horizontally for processing. A threaded stem 50 can support a tire in a horizontal position and is itself supported in bearings of a frame structural arrangement 52. The threaded stem member 50 may be rotated by way of a chain wheel 54, a chain drive 56 and a step up gear box arrangement 58. The latter may be driven by an electric motor 60 as will be understood.

The length of the frame members of structure 52 is selected for stabilizing of the arrangement and the structure is anchored in concrete as shown at points 62. As will be appreciated, the size of the stem member 50 may be selected in accordance with the size of the tire to be processed. In FIG. 5 there is diagrammatically illustrated, partly in section, a support structure for a tire suitable for use in the apparatus of FIG. 1. A wishbone type of umbrella mechanism 64 is provided at each end of the main shaft 14. Each umbrella mechanism comprises four umbrella arms 66 comprising the wishbone arrangement of the umbrella mechanism. The wishbone arrangement is connected by lever arms 68 to a slideable member 70. Apertures 72 are provided at intervals along the respective portion of the length of shaft 14 whereby the member 70 can be locked in position by means of a pin 74.

When a tire 76 is supported on support portion 78 (FIG. 5) the wishbone arrangement is positioned to hold the tire and member 70 is pinned at the appropriate position depending on the size of the tire. A nut 80 is then threaded down the drive shaft member 14 so as to lock the umbrella mechanism in position so as to hold the tire 76 tightly. It will be observed that the wishbone members 66 are provided with hook shaped ends 82 so as to lock on to the edge of the respective tire whilst their other ends are pivotally attached to a slideable member 83.

Referring to FIG. 6 there is illustrated a further embodiment of the invention similar to that shown in FIG. 1. It is shown in slightly greater detail than the embodiment of FIG. 1 but the same reference numerals have been applied to like or corresponding parts.

Referring to FIG. 6 it will be seen that the elongated member or arm 24 is pivoted at point 25 and sloped covers 27 are provided. One cover also is over a 7½ H.P. electric belt drive to an auto differential 29 for drive shaft 14.

This is a locked-type spindle-drive differential.

One of the expansion tire mount umbrella-type mechanisms 64 is shown in greater detail at one end of shaft 14 whilst safety guards 31 are shown at the other end. A vacuum extraction system 33 including a collector fan is also represented in FIG. 6.

A handle 33' is provided for moving the cutter head 46 to its different positions around a tire and between tires 76. A screw tightener impact wrench mechanism 35 is shown at the end of the umbrella type mechanism 64.

On the machine base 37, there is mounted a bolt-on hoist pillar arrangement 39. The latter pivotally supports an elongate hoist beam 41. At the free end of beam 41 an electric chain hoist arrangement 43 is provided with a manual grapple clam mechanism 45 whereby a tire can be lifted and moved on to or away from an expansion tire mount 64.

Referring now to FIG. 7, the process involved in processing tires is diagrammatically illustrated in block form.

The various blocks in FIG. 7 constitute a representation of typical situations encountered in practice. For example, on the left hand side of FIG. 7 there are identified different sources 90 from which tire casings may be received. These will be stock-piled at 92, cleaned out at station 94 and the beads cut off at station 96, with the steel therefrom being sold to scrap metal dealers, represented at 98. As will be appreciated, the zones or stations up to this point are particularly labour intensive.

After cutting off the beads from the tires, the tires then proceed to a shredding station 100. The products of the shredding station may be directly marketed as indicated by station 101 or, alternatively, the fragments may be screened at station 104 into different grades. This is indicated at station 106 where the grades coarse, medium and fine are identified. After blending and adding of mixtures etc. at station 108, the fragment material exits at 110. As will be observed, provision may be provided for new product research and development at station 112. The product exiting at 110 may be utilized for different purposes as indicated at the stations 114. The marketing thereof is generally identified at the blocks representing stations 116.

As will be appreciated, computerization may readily be introduced particularly in and up to the stations 114. Again, after this point the different stations 116 may become more labour-intensive.

In use, the tire casings are mounted on the end of the drive shaft 14 (FIG. 1) and the respective umbrella arrangements 20 and 22 are used to hold the tire casings in place. An operator then manipulates the arm 28 whereby the cutter at the end of slider arm 32 engages with the tire casing at 22. The resulting fragments are collected for subsequent processing. The arm 28 is then pivoted about pivot point 26 whereby the cutter at the end of slider arm 32 engages with the tire casing held in place at the other end of the drive shaft 14 by the umbrella arrangement 20. Again, the tire fragments are collected for subsequent processing. During the operation, the tires are rotated due to operation of the electric motor 4.

Due to the particular construction illustrated, the varius arms permit the operation to go right around the tire to remove all the usable rubber from the face of the tire and from the sidewalls. The motor 48 (FIG. 3) spins the cutter 46 in the opposite direction to the rotation of the tire. As will be understood, the cutter may conveniently be a rocket rasp device. After the cutting operation, a carcass remains and the beads may be cut thereof by a bead cutter. The beads may then be stretched.

The usable rubber may be forwarded in bulk or in bags to a known market for such material.

It will be understood that it may be convenient for a tire at one end of the drive shaft to spin in the opposite direction to the tire at the other end of the drive shaft.

The arms of the apparatus may, of course, be adjustable in length so as to accommodate different sizes of tire casings.

It will be understood that some of the fragments of rubber material obtained may be of a relatively fine texture and particularly suitable for further processing. By use of a suitable bonding material one may even produce soles for shoes.

The environmental advantages of the apparatus and method according to the present invention will be readily apparent when one considers that there are millions of tires just lying about in dumps throughout the American continent. By use of the apparatus according to the present invention there will be little or no waste remaining. In this way substantial environmental advantages should be achieved.

It will be readily apparent to a person skilled in the art that a number of variations and modifications can be made without departing from the true spirit of the invention which will now be pointed out in the appended claims.

I claim:

1. Apparatus for shredding tire casings comprising,
   (a) means for supporting a tire casing,
   (b) means for rotating the tire casing,
   (c) cutter means comprising shredder means having a plurality of teeth to form a plurality of multi-cutting edges for converting said tire casing into fine fragment portions,
   (d) said cutter means being mounted for slideable movement on a first elongate arm member and for movement to different positions around the tire casing in a plane containing the axis of the tire casing to reduce the whole tire casing to a fine fragment form,
   (e) said first arm member being pivotally mounted on a second elongate arm member,
   (f) said second arm member being itself pivotally mounted on a stationary supporting member,
   (g) whereby said cutter means is capable of movement towards and away from said tire casing.

2. Apparatus according to claim 1 wherein:
   (a) a further means for supporting a further tire casing is provided,
   (b) said means for rotating being capable of rotating said further tire casing, (c) said second arm member being capable of pivotal movement from a first position where said cutter means is in contact with said first tire casing to a second position where said cutter means is in contact with said further tire casing.

3. Apparatus for shredding tire casings comprising:
(a) means for supporting a tire casing,
(b) means for rotating the tire casing,
(c) cutter means comprising shredder means having a plurality of teeth to form a plurality of multi-cutting edges for converting said tire casing into fine fragment portions,
(d) said cutter means being mounted for slidable movement on a first elongate arm member and for movement to different positions around the tire casing in a plane containing the axis of the tire casing to reduce the whole tire casing to a fine fragment form,
(e) said first arm member being pivotally mounted on a second elongate arm member,
(f) said second arm member being itself pivotally mounted on a stationary support member,
(g) whereby said cutter means is capable of movement towards and away from said tire casing,
(h) a further means for supporting a further tire casing,
(i) said means for rotating being capable of rotating said further tire casing,
(j) said second arm member being capable of pivotal movement from a first position where said cutter means is in contact with said first tire casing to a second position where said cutter means is in contact with said further tire casing,
wherein each means for supporting a tire casing includes an umbrella type of arrangement comprising a plurality of wishbone members, one end of each wishbone member being adapted to engage in an edge of said tire casing and the other end being pivotally connected to a slideable member moveable on a drive shaft and a nut member for tightening the umbrella type arrangement to hold the respective tire casing positively in position for rotation.

4. Apparatus according to claim 3 wherein each of said supporting means is mounted at opposite ends of said drive shaft, a gear box arrangement being provided intermediate said ends, and a motor being provided to rotate said drive shaft by way of said gear box.

5. Apparatus according to claim 4 wherein said motor is connected to said gear box by way of a double pulley arrangement.

6. Apparatus according to claim 2, 3 or 4 wherein said first arm member is provided with longitudinal lips along each side, a cutter arm member upstanding transversely of a carriage member, and carriage wheels engaging on the upper and lower surfaces of each lip whereby said carriage member is moveable longitudinally on the first arm member, said cutter means being mounted on said cutter arm member.

7. Apparatus according to claim 2, 3 or 4 wherein said cutter means is driven by a separate motor.

8. Apparatus according to claim 2, 3 or 4 including a hoist arrangement capable of hoisting a tire casing and moving it on to and away from said means for supporting a tire casing.

9. An environmental method of disposing of used or unwanted tire casings comprising the steps of:
(a) collecting the tire casings,
(b) separating metal portions from said tire casings,
(c) shredding the tire casings by supporting each tire casing,
(d) rotating said tire casing,
(e) providing shredder means having a plurality of teeth forming a plurality of multi-cutting edges for converting the tire casing into fine fragment portions,
(f) sliding said shredder means on a first elongate arm member and moving it around said tire casing to different positions in a plane containing the axis of the tire casing to reduce the whole tire casing to a fine fragment form,
(g) screening the shredded tire casings into appropriate portions according to size,
(h) processing said portions for marketing, the processing being dependent on the eventual market of the respective portions.

10. Apparatus for shredding tire casings comprising:
(a) a table having an electric motor mounted on its top surface,
(b) an elongate shaft rotatably driven by said motor,
(c) at the opposite ends of said shaft, means for supporting a tire casing including an umbrella type of arrangement comprising a plurality of wishbone members, one end of each wishbone member being adapted to engage in the edge of said tire casing,
(d) cutter means comprising shredder means having a plurality of teeth to form a plurality of multi-cutting edges for converting said tire casing into fine fragment portions,
(e) said cutter means being mounted for slideable movement on a first elongate arm member and for movement to different positions around the tire in a plane containing the axis of the tire casing to reduce the whole tire casing to a fine fragment form,
(f) said first arm member being pivotally mounted on a second elongate arm member,
(g) said second arm member protruding from under the top surface of said table and being pivotally attached to said table at its end remote from the first arm member whereby it is capable of pivotal movement from a first position where said cutter means is in contact with one of said tire casings to a second position where said cutter means is in contact with the other of said tire casing.

* * * * *